United States Patent
Murray et al.

(10) Patent No.: US 7,011,280 B2
(45) Date of Patent: Mar. 14, 2006

(54) TRIPOD ASSEMBLY

(75) Inventors: Christopher J. Murray, Balitmore, MD (US); Aldo Balatti, Greely (CA); Robert D. Watters, Ottawa (CA); James D. Marshall, Mallorytown (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/979,953

(22) Filed: Nov. 2, 2004

(65) Prior Publication Data

US 2005/0092878 A1 May 5, 2005

Related U.S. Application Data

(60) Provisional application No. 60/516,704, filed on Nov. 3, 2003.

(51) Int. Cl.
*F16M 11/38* (2006.01)

(52) U.S. Cl. .................... 248/171; 248/187.1; 396/419

(58) Field of Classification Search ............... 248/171, 248/170, 166, 167, 163.1, 163.2, 177.1, 187.1; 396/419, 428

See application file for complete search history.

(56) References Cited

U.S. PATENT DOCUMENTS

| | | | |
|---|---|---|---|
| 1,573,496 A | 2/1926 | Jansson | |
| 1,637,836 A | 8/1927 | Rubin | |
| 2,195,391 A | 3/1940 | Hunter | |
| 2,966,107 A | 12/1960 | Sanderson | |
| 3,771,876 A | 11/1973 | Ljungdahl | |
| 4,169,338 A | 10/1979 | Eik | |
| 4,309,010 A | 1/1982 | Posso | |
| 4,324,477 A * | 4/1982 | Miyazaki | 248/163.1 |
| 4,578,870 A | 4/1986 | Cooke | |
| 4,852,265 A | 8/1989 | Rando | |
| 4,886,230 A * | 12/1989 | Jones et al. | 248/170 |
| 5,070,620 A | 12/1991 | Crain | |
| 5,137,236 A * | 8/1992 | Burns | 248/171 |
| 5,144,487 A | 9/1992 | Hersey | |
| 5,222,708 A | 6/1993 | McLellan | |
| 5,322,334 A | 6/1994 | Hammer | |
| 5,505,415 A | 4/1996 | Brett | |
| 5,552,886 A | 9/1996 | Kitajima | |
| 5,560,573 A | 10/1996 | Colver | |
| 5,590,891 A | 1/1997 | Kazmark, Jr. | |
| 5,601,265 A | 2/1997 | Lopez | |
| 5,914,778 A | 6/1999 | Dong | |
| 5,954,531 A | 9/1999 | Jennings | |
| 6,421,360 B1 | 7/2002 | Kousek | |
| 6,789,772 B1 * | 9/2004 | Eason | 248/166 |
| 2005/0082444 A1 * | 4/2005 | Raynaud | 248/171 |

FOREIGN PATENT DOCUMENTS

| | | |
|---|---|---|
| DE | 1 169 146 | 1/1958 |
| DE | 17 73 637 | 6/1968 |
| DE | 2 036 050 | 7/1970 |

(Continued)

*Primary Examiner*—Ramon O Ramirez
(74) *Attorney, Agent, or Firm*—Harness, Dickey & Pierce, P.L.C.

(57) ABSTRACT

A tripod assembly having a base and a head mounted to the base. A plurality of legs are coupled to the base and are moveable between an open position and a closed position. The plurality of legs form a tripod to support the base and head in an upright position when the legs are in the open position. The plurality of legs at least partially enclose the base and the head when in the closed position.

19 Claims, 7 Drawing Sheets

FOREIGN PATENT DOCUMENTS

| | | |
|---|---|---|
| DE | 22 31 964 C2 | 6/1972 |
| DE | GM 76 36 864 | 3/1977 |
| DE | 27 57 340 | 12/1977 |
| DE | GM 78 33 428 | 11/1978 |
| DE | 29 41 377 C2 | 10/1979 |
| DE | 195 27 829 A1 | 7/1995 |
| DE | 196 36 413 C1 | 9/1996 |
| DE | 197 30 928 C2 | 7/1997 |
| DE | 299 14 297 U1 | 8/1999 |
| DE | 100 26 559 A1 | 5/2000 |
| DE | 100 31 131 A1 | 6/2000 |
| DE | 100 65 247 A1 | 12/2000 |
| DE | 100 65 250 A1 | 12/2000 |
| EP | 0 683 350 B1 | 5/1995 |
| EP | 1 096 224 A2 | 10/2000 |
| FR | 668214 | 10/1928 |

* cited by examiner

TRIPOD ASSEMBLY

CROSS-REFERENCE TO RELATED APPLICATIONS

This application claims the benefit of U.S. Provisional Application No. 60/516,704, filed on Nov. 3, 2003, the disclosure of which is incorporated herein by reference.

FIELD OF THE INVENTION

The present invention relates to a tripod assembly and more particularly to a folding tripod assembly.

BACKGROUND OF THE INVENTION

The tripod is not new in the art, and the basic principle involved with its use is fairly simple-three legs used to provide a stable platform. The potential applications for tripods are numerous, although one common use is as a portable stand for a device or tool. For example, tripods are used in applications ranging from supporting a laser sight for surveying, a camera for photography, a telescope for sky viewing, and an antenna in communication systems.

In this regard, these common uses often involve transportation of the tripod and associated device. Whether to a photo shoot or to a construction sight, transportation of the tripod and associated device raises two important issues-one of size and one of protection.

As to size, it can be inconvenient to transport a large tripod assembly due to the inherent spread of the tripod legs. A past solution is to allow the legs to fold into a linear assembly. However, issues of length of the assembly may still persist. As to protection of the associated device, which is often expensive and fragile, the typical solution in the past is to remove the device and store it separately from the tripod assembly. However, separate storage can be inconvenient and time consuming. Accordingly, there remains in the art room for improvement in transporting a tripod assembly.

Therefore, it is an object of the present invention to provide a tripod assembly that folds into a compact size and also protects any device mounted thereon.

SUMMARY OF THE INVENTION

A tripod assembly is provided having a base and a head mounted to the base. A plurality of legs are coupled to the base and are moveable between an open position and a closed position. The plurality of legs form a tripod to support the base and head in an upright position when the legs are in the open position. The plurality of legs at least partially enclose the base and the head when in the closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
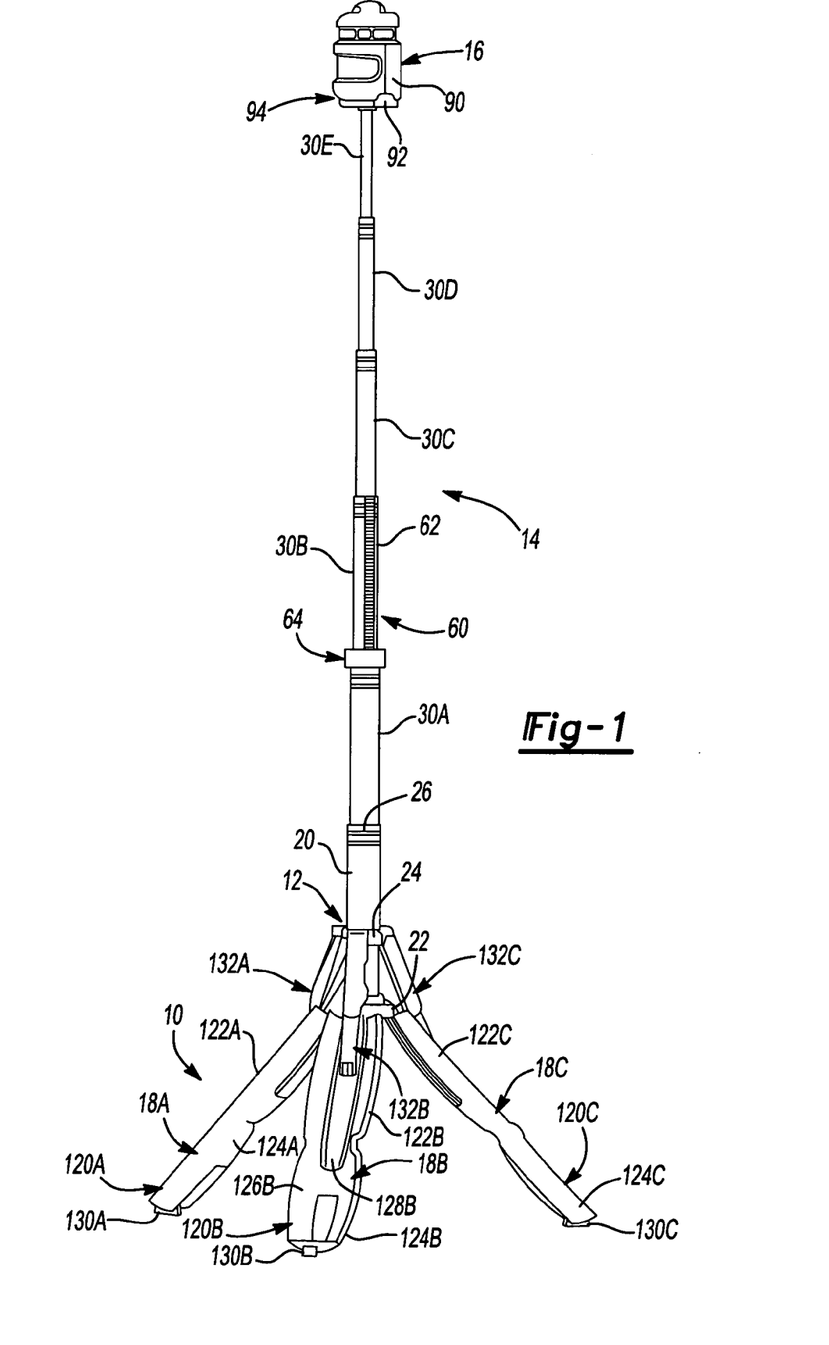
FIG. 1 is a perspective view of a tripod assembly constructed according to the principles of the present invention and illustrating a neck in an extended position.

With reference to FIG. 1, there is shown a tripod assembly 10 constructed according to the principles of the present invention. The tripod assembly 10 includes a base 12, a neck portion 14 extending from the base 12, a head 16 removably coupled to an end of the neck portion 14, and three legs 18A, 18B, and 18C extending out from the base 12.

The base 12 generally includes a hollow cylindrical body 20 with a cap 22 mounted on an end thereof. At an end 26 of the cylindrical body 20 opposite the cap 22, the cylindrical body 20 is open for receiving the neck 14. A collar 24 is mounted around the cylindrical body 20. The collar 24 and the cap 22 cooperate to allow movement of the three legs 18A, 18B, 18C as will also be described in greater detail below.

Figure 2:
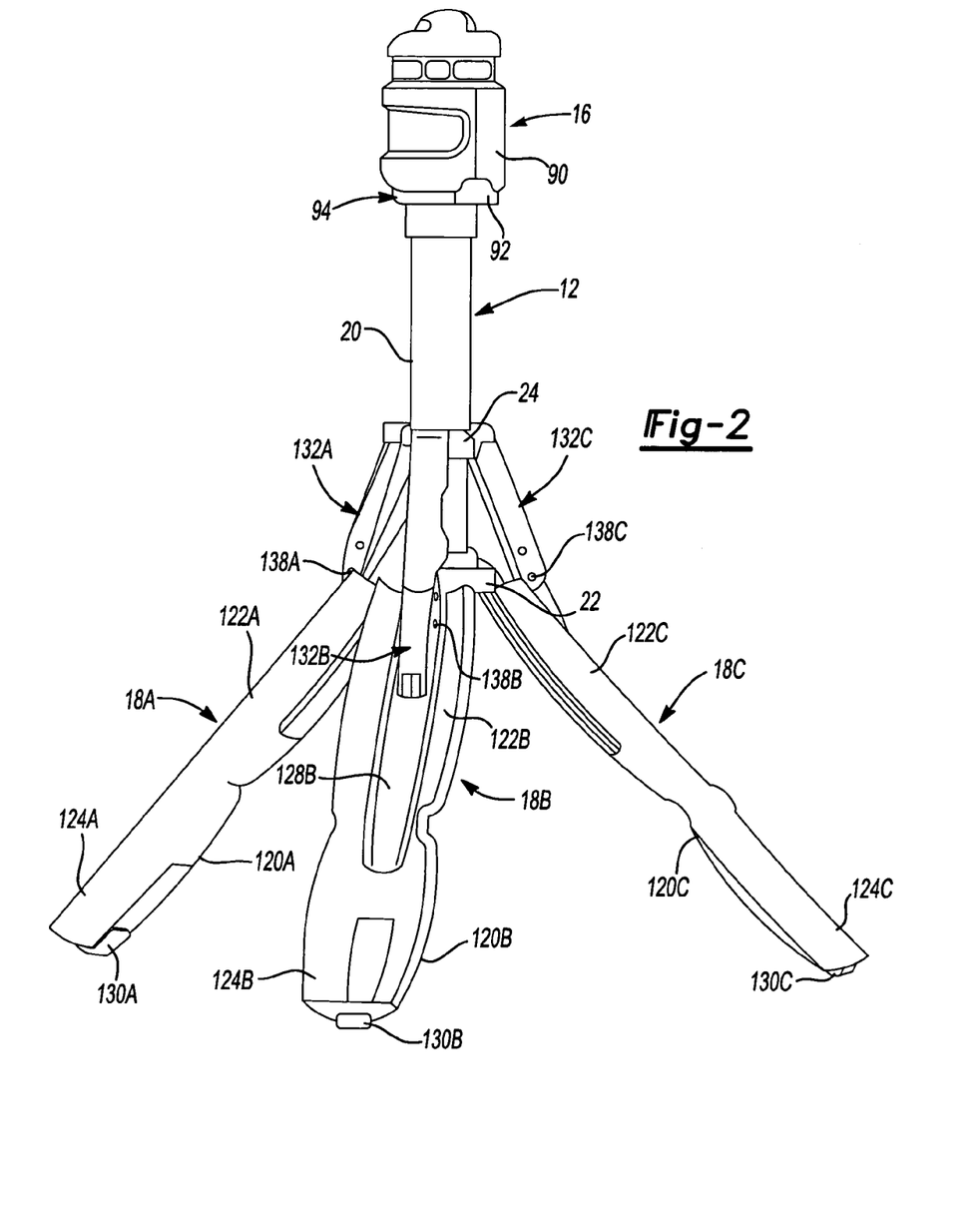
FIG. 2 is a perspective view of the tripod assembly of FIG. 1 with the neck in a collapsed position.
Figure 4:
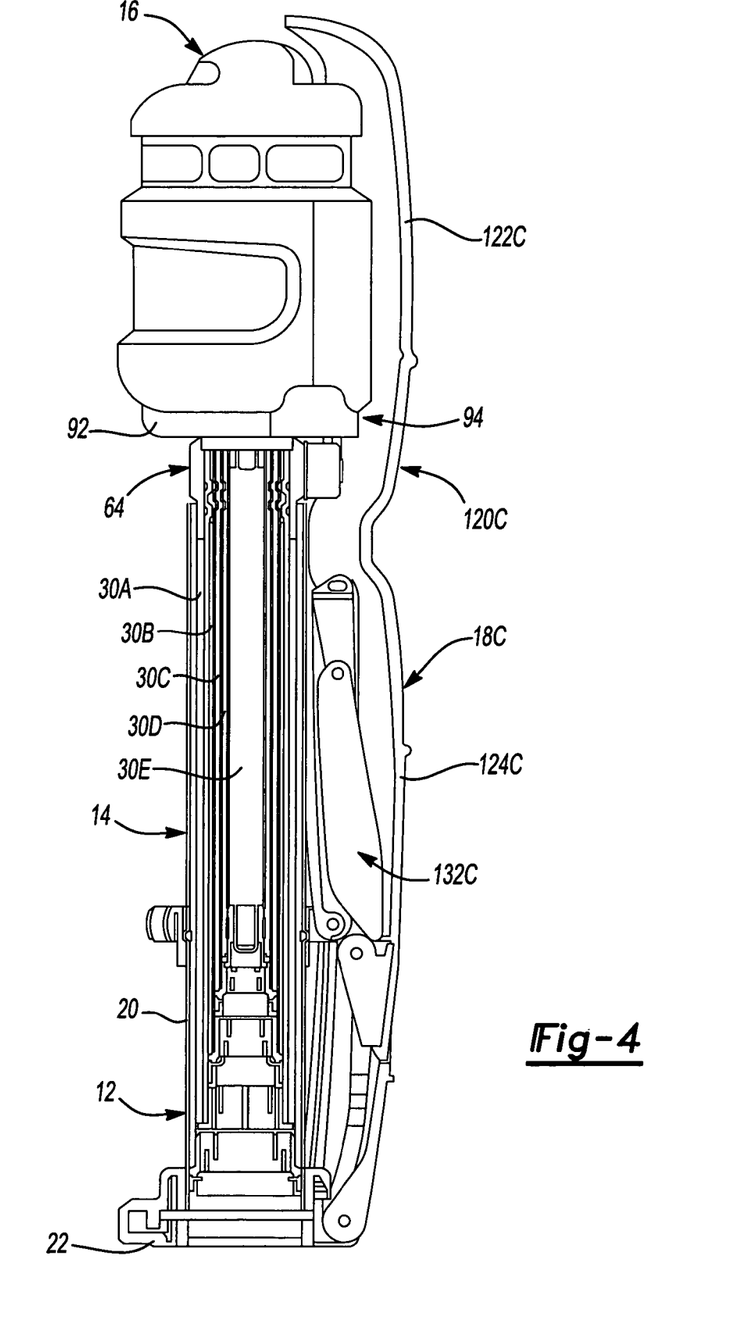
FIG. 4 is a side partial cross section of the tripod assembly in the closed position with two of the three legs not illustrated.

The neck 14 telescopes between an extended position as shown in FIG. 1 and a collapsed position as shown in FIG. 2. The neck 14 includes a plurality of segments 30A, 30B, 30C, 30D, and 30E. The segments 30A–E are each hollow cylinders and are sized such that one of the segments 30A–E fits within another such that the neck 14 may be extended or collapsed. Preferably, as best seen in FIG. 4, segment 30A has an outer circumference less than an inner circumference of the hollow cylindrical body 20 of the base 12, segment 30B has an outer circumference less than an inner circumference of 30A, and so on such that segment 30E has an outer circumference less than an inner circumference of segment 30D.

Figure 5A:
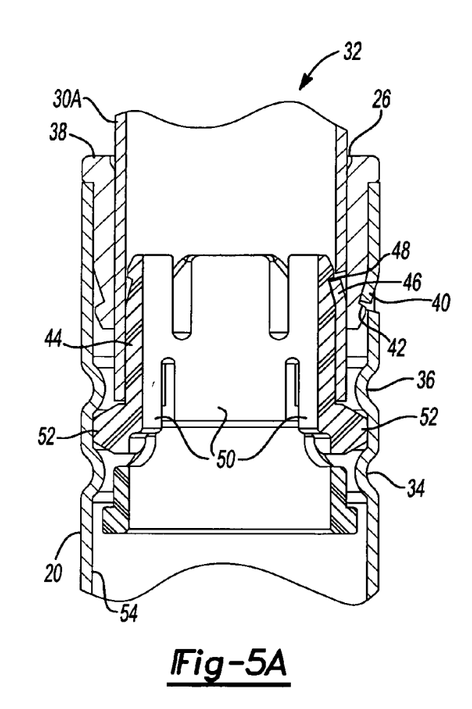
FIG. 5A is a side cross section of a portion of the neck of the tripod assembly illustrating a detent system in an extended position.
Figure 5B:
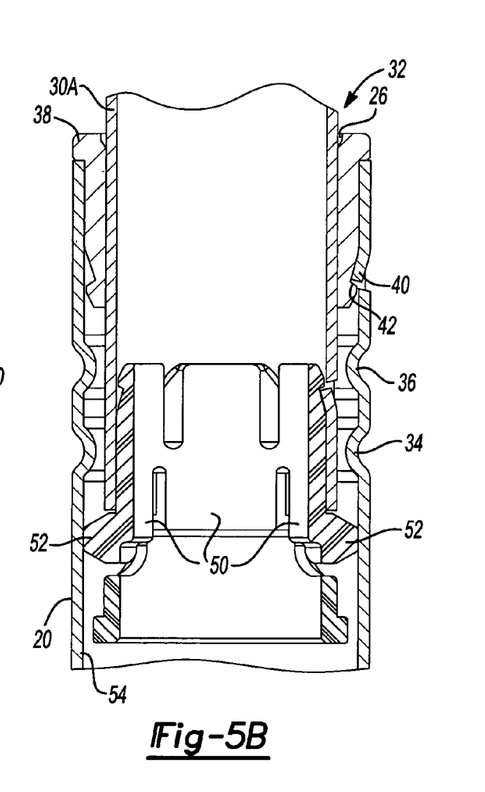
FIG. 5B is a side cross section of the portion of the neck of the tripod assembly illustrating the detent system in a collapsed position.

The segments 30A–E are held in place in the extended position by a detent system common to each of the segments 30A–E and the hollow cylindrical tube 20. Turning briefly to FIGS. 5A and 5B, this detent system, indicated generally by reference numeral 32, will be described with reference to the hollow cylindrical tube 20 and segment 30A. However, it is to be understood that the detent system 34 is used with all the segments 30A–E.

As noted above, segment 30A fits within the open end 26 of the hollow cylindrical tube 20. The hollow cylindrical tube 20 has a first detent 34 and a second detent 36 formed therein near the open end 26. The detents 34, 36 are formed around the entire circumference of the hollow cylindrical tube 20 and are spaced such that they are proximate to one another. A sheath 38 fits within the open end 26 and is held in place by a third detent 40 that engages a groove 42 formed in the sheath 38. The sheath 38 is sized to receive segment 30A.

Segment 30A includes an end cap 44 coupled to an end of segment 30A located within the hollow cylindrical tube 20. The end cap 44 is held in place by a detent 46 formed in segment 30A that engages a groove 48 formed in the end cap 44. The end cap 44 includes a plurality of tabs 50, three in the example provided, that extend out from segment 30A. Each tab 50 includes a head portion 52 sized such that it engages an inner surface 54 of the hollow cylindrical tube 20.

As seen in FIG. 5A, segments 30A–E of the neck 14 are in an extended position when the head portions 52 are located between the first and second detents 34, 36. As seen in FIG. 5B, urging segment 30A towards the base 12 forces the tabs 50 to deflect radially inward such that the head portions 52 move past the first detent 34. Since all the segments 30A–E use the detent system 32 described above, the neck 14 may be collapsed or extended using any combination of the segments 30A–E.

Returning to FIG. 1, the neck 14 further includes an incremental adjustment system 60 comprising a rack 62 formed along the length of segment 30B and a pinion collar 64 mounted on an end thereof. It is to be noted, however, that the incremental adjustment system 60 may be located on any of the segments 30A–E or the base 12. The fine tune adjustment system 60 incrementally moves segment 30B from its collapsed position wherein segment 30B is located within segment 30A to an extended position wherein segment 30B extends fully out from segment 30A.

Figure 6:
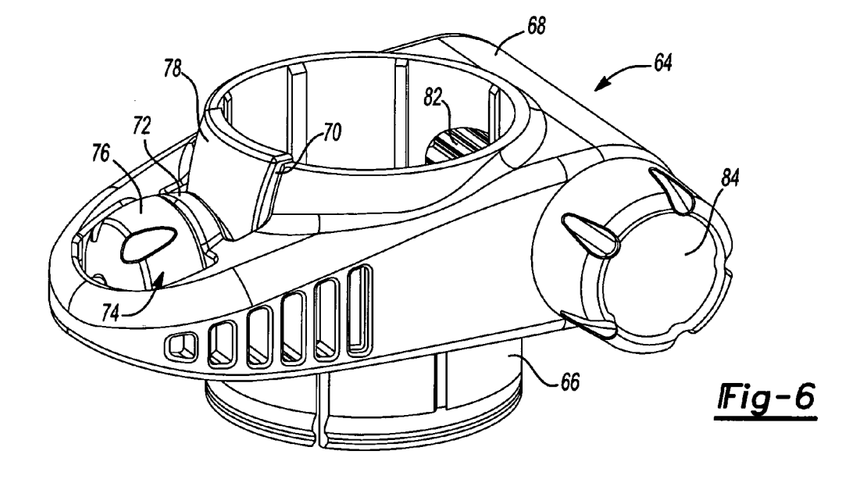
FIG. 6 is an enlarged perspective view of a portion of an incremental adjustment system of the tripod assembly.

With reference to FIG. 6, the pinion collar 64 includes a sheath portion 66 and an adjustment portion 68. The sheath portion 66 is sized to fit over segment 30B. The sheath portion 66 has a gap 70 formed in its side in alignment with a threaded mount 72 formed in the adjustment portion 68. A screw plate 74 is mounted within the threaded mount 72. The screw plate 74 includes a head 76 and a plate 78 with a threaded portion (not shown) therebetween. The plate 78 extends within the gap 70. Movement of the head 76 drives the screw plate 74 within the threaded mount 72 and urges the plate 78 against segment 30B, thereby allowing tightening or loosening of the pinion collar 64 relative to segment 30B. A pinion 82 is mounted in the adjustment portion 68 and engages the rack 62 on segment 30B. The pinion 82 includes an easily accessible head 84 that is used to rotate the pinion 82 and in turn drive segment 30B up or down in small increments. Using the incremental adjustment system 60, the neck 14 may be moved from its fully extended position, shown in FIG. 1, to its fully collapsed position, shown in FIG. 2, and any height therebetween.

Returning to FIG. 1, the head 16 includes a housing 90 for preferably storing a laser leveler (not shown). Alternatively, the housing 90 may be used to protect any particular application that requires mobility and versatility, such as a sight scope or camera. The head 16 is mounted to a plate 92 formed at an end of segment 30E.

Figure 7A:
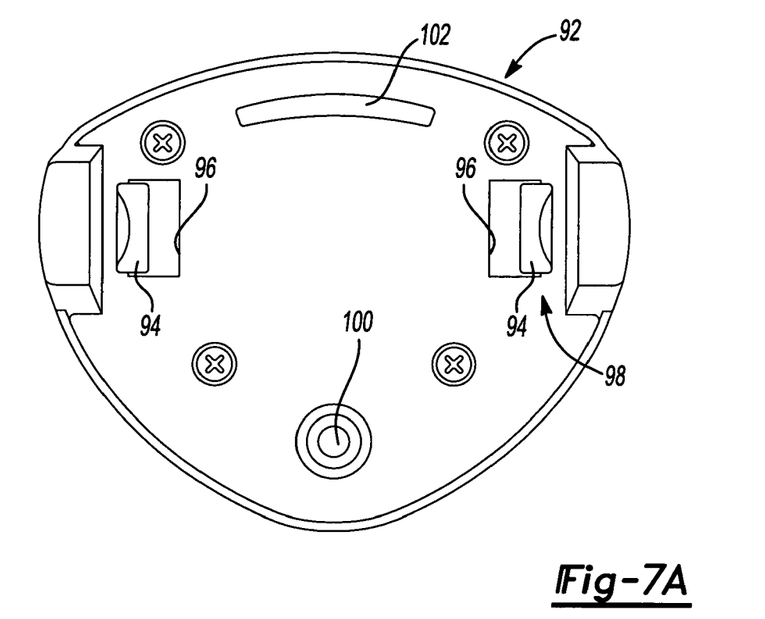
FIG. 7A is a top view of a portion of the neck of the tripod assembly.

Turning now to FIG. 7A, the attachment of the head 16 to the plate 92 will be described in further detail. Locking tabs 94 extend out from recesses 96 formed in the plate 92 and form part of a locking mechanism 98 that will be described in greater detail below. A centering tab 100 and a securing ridge 102 also extend out from the plate 92 and aid in the securing of the head 16 onto the plate 92.

Figure 7B:
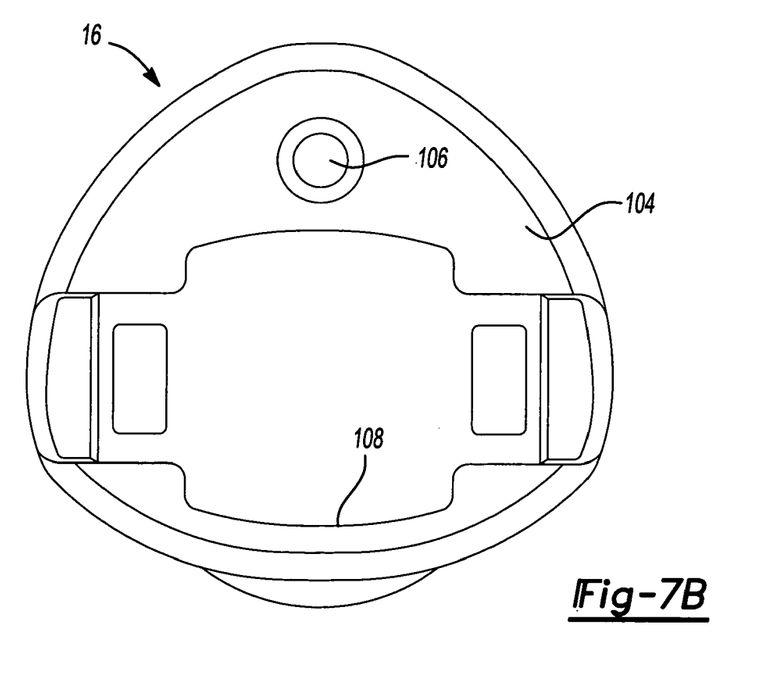
FIG. 7B is a bottom view of a head of the tripod assembly.

Turning to FIG. 7B, the head 16 has a bottom 104 essentially shaped to match the plate 92. Specifically, a centering hole 106 is formed in the bottom 100 for receiving the centering tab 100 (FIG. 7A). Moreover, a contoured edge 108 is formed on the bottom 104 that is shaped to engage the securing ridge 102 (FIG. 7A).

Figure 8:
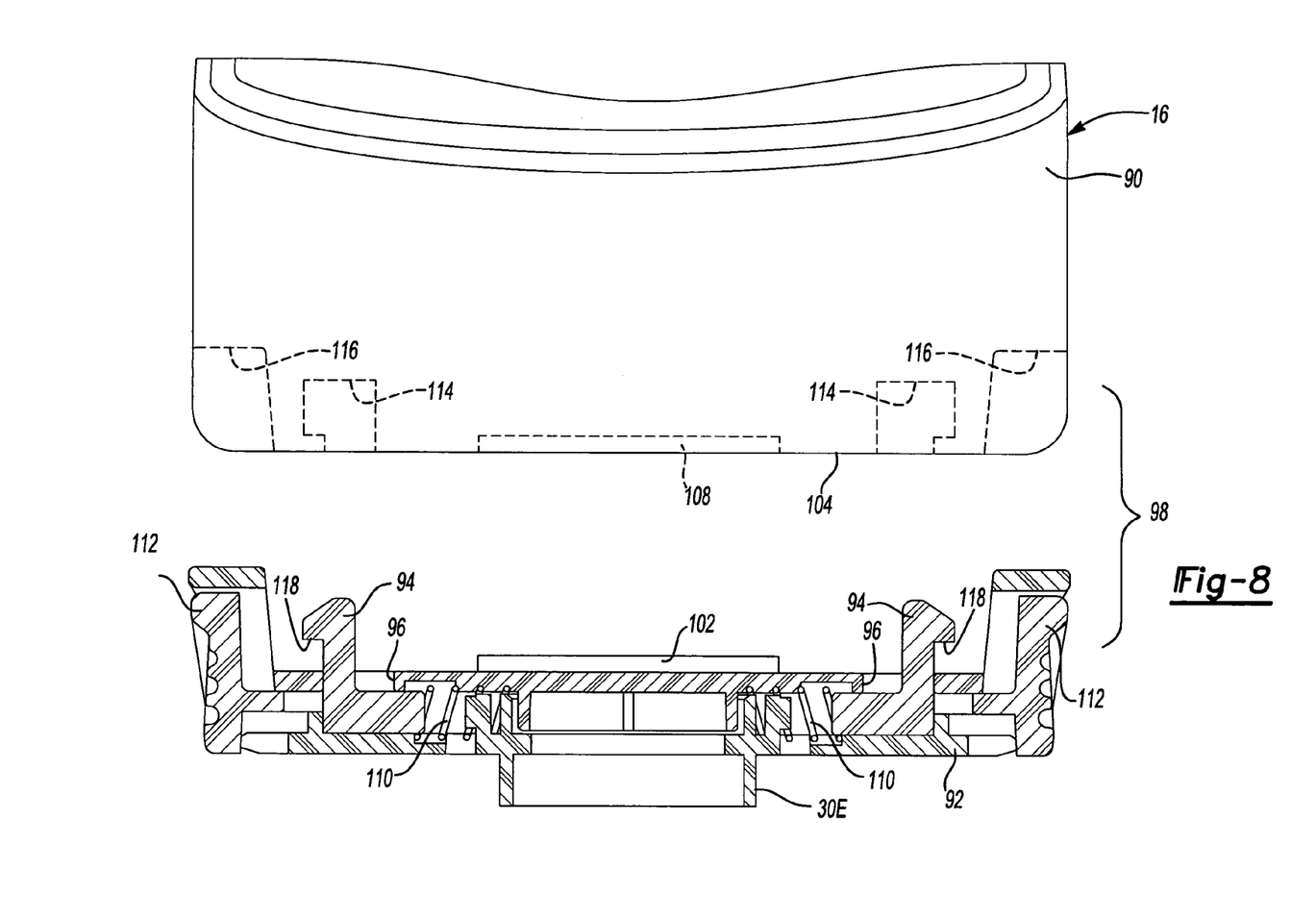
FIG. 8 is an enlarged side view of the head and the portion of the neck shown in FIGS. 7A and 7B.

With reference to FIG. 8, the locking mechanism 98 will now be described in detail. The locking tabs 94 are each biased by a biasing member 110, a spring in the preferred embodiment, to a locked position. Buttons 112 are mounted on each side of the plate 92 and engage the locking tabs 94. The buttons 112 may be pushed towards one another against the biasing force of the biasing members 110 to move the locking tabs 94 to an unlocked position. The bottom 104 of the head 16 includes locking tab recesses 114 sized to receive the locking tabs 94 and button recesses 116 sized to receive the buttons 112.

To lock the head 16 onto the plate 92, the buttons 112 are urged against the biasing members 110 such that the locking tabs 94 move to the unlocked position. The head 16 is then placed onto the plate 92 such that the centering tab 100 (FIG. 7A) aligns with the centering hole 106 (FIG. 7B), the securing ridge 102 abuts the contoured edge 108, and the locking tabs 94 extend into the locking tab recesses 114. The buttons 112 are then released, and the locking tabs 94 move to the locked position where lips 118 formed on the locking tabs 94 engage the locking tab recess 114 and prevent removal of the head 16 from the plate 92. To remove the head 16, the buttons 112 must again be depressed such that the lips 118 are clear of the locking tab recesses 114, at which time the head 16 may be freely removed.

Returning again to FIG. 1, the legs 18A–C will now be described. Each leg 18A–C includes a body 120A–C having a first portion 122A–C and a second portion 124A–C. Each body 120A–C further defines an inner surface 126A–C (best seen in FIG. 3) having a groove 128A–C (best seen in FIG. 3) formed therein. The legs 18A–C are rotatingly coupled at an end of their first portions 122A–C to the cap 22 of the base 12 to form a tripod configuration. Rubber stoppers 130A–C are formed at an end of the second portions 124A–C opposite the first portions 122A–C to provide a gripping surface for the legs 18A–C.

The legs 18A–C further include snap bars 132A–C that extend from the inner surface 126A–C to the base 12. The snap bars 132A–C have a first member 134A–C and a second member 138A–C pivotably coupled to one another. Specifically, the first members 134A–C are each pivotably coupled to the collar 24 of the base 12 and the second members 138A–C are each pivotably coupled to the inner surfaces 126A–C of each leg 18A–C. Accordingly, when the legs 18A–C are in the extended position forming a tripod configuration as seen in FIG. 1, a locking feature 140A–C on the snap bars 132A–C keep the first member 134A–C aligned with the second member 138A–C such that the snap bars 132A–C act as struts for the legs 18A–C and lock the legs 18A–C into their extended positions. Preferably, the locking feature 140A–C includes a snap fit detent between the first member 134A–C and the second member 138A–C, although various other methods of locking may be employed.

Figure 3:
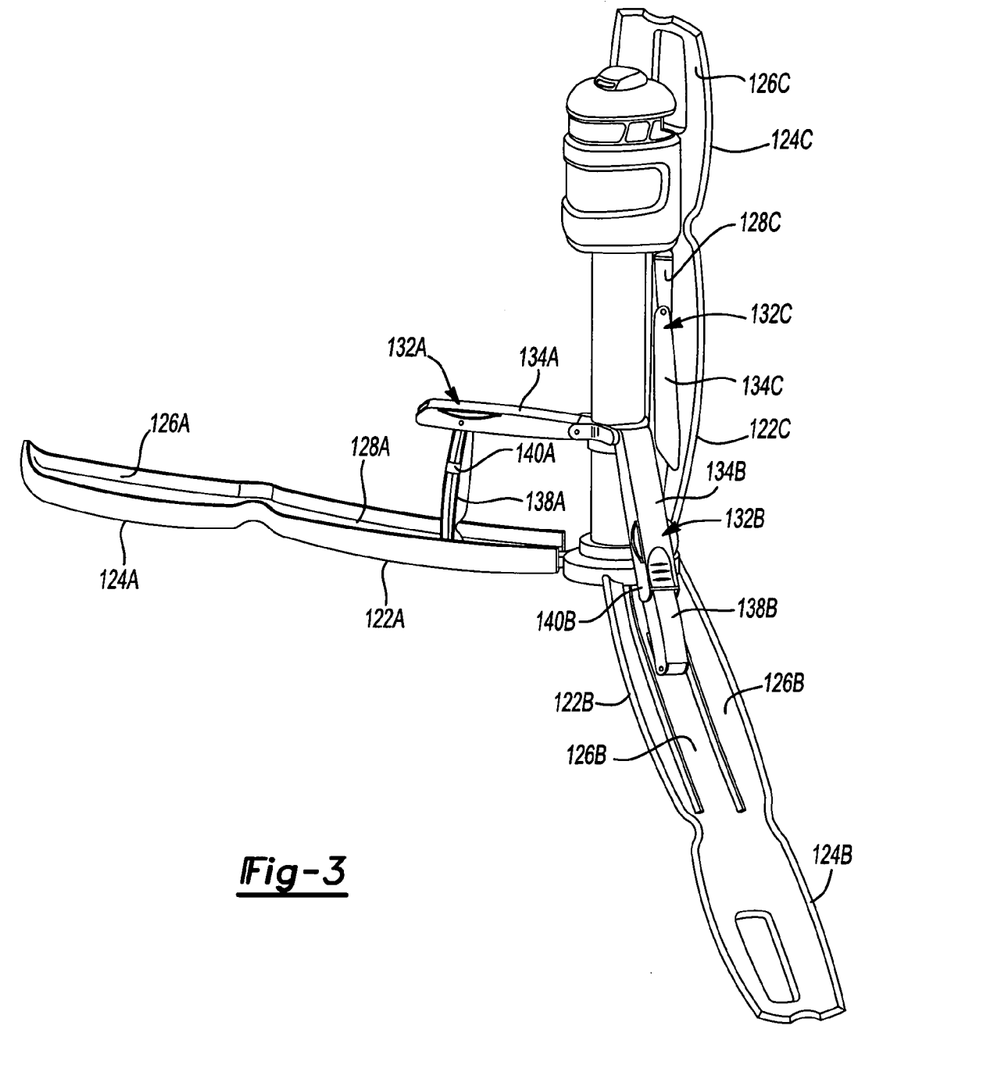
FIG. 3 is a perspective view of the tripod assembly of FIGS. 1 and 2 illustrating movement of the legs to a closed position.

In order to store the tripod assembly 10, the neck 14 must be fully collapsed as illustrated in FIG. 2. The locking feature 140A–C is then disengaged by pulling on an end of the first member 134A–C. This releases the first and second members 134A–C, 138A–C and allows them to pivot with respect to one another. Then, as illustrated in FIG. 3, the snap bars 132A–C must be moved such that the first member 134A–C no longer aligns with the second member 138A–C. The legs 18A–C may then be moved from the extended position to a closed position, shown in FIG. 4. It should be noted legs 18A and 18C have been removed from FIG. 4 for the sake of clarity.

Specifically, the legs 18A–C pivot about the cap 22 of the base 12. Simultaneously with this pivoting, the snap bars 132A–C fold such that the second members 138A–C fit within the first members 134A–C. The first members 134A–C are in turn held within the grooves 128A–C.

In the collapsed position shown in FIG. 4, the first portions 126A–C encapsulate the neck 14 and the base 12 while the second portions 128A–C encapsulate the head 16. The inner surfaces 126A–C of the legs 18A–C are contoured to fully enclose the base 12, neck 14, and head 16 thereby providing a protective shell. The protective shell provides a circumferentially enclosed area which is greater than the circumferentially open area that is created when the legs 18A–C are in the closed position. The legs 18A–C may be held in the closed position by any conventional locking mechanism (not shown).

This protective shell formed by the legs 18A–C in the closed position provides a compact profile for the tripod assembly 10 thereby making the tripod assembly easily transportable. Also, the legs 18A–C serve to protect the head 16 from damage during transport or storage without requiring removal and separate storage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A support assembly comprising:
   a base;
   a head mounted to said base; and
   a plurality of legs coupled to said base and moveable between an open position and a closed position, said legs each including a snap bar extending from an inner surface of said legs to said base, said snap bar having a first member and a second member pivotally coupled to one another and a locking feature for locking said legs in said open position;
   wherein said plurality of legs form a support for said head in an upright position when in said open position and said plurality of legs at least partially enclose said base and said head when in said closed position.

2. The support assembly of claim 1, wherein said legs include a first portion for enclosing said head when said legs are in said closed position.

3. The support assembly of claim 2, wherein said legs include a second portion for enclosing said base when said legs are in said closed position.

4. The support assembly of claim 1, wherein said head includes a laser sight.

5. The support assembly of claim 1, wherein said first member is in alignment with said second member when said legs are in said open position and said first member is out of alignment with said second member when said legs are in said closed position.

6. The support assembly of claim 1, wherein said locking feature is formed between said first member and said second member and locks said first member into alignment with said second member when said legs are in said open position.

7. The support assembly of claim 1, wherein said legs include a groove formed on the inner surface, said groove receiving said snap bar when said legs are in said closed position.

8. The support assembly of claim 1, further comprising a neck coupled between said head and said base, said neck extendable and collapsible to support said head at various heights.

9. The support assembly of claim 8, further comprising an incremental movement system coupled to said neck, said incremental movement system for incrementally extending or collapsing a portion of said neck.

10. The support assembly of claim 9, wherein said incremental movement system includes a rack formed on said neck and a collar having a pinion, said pinion in engagement with said rack to incrementally move said neck.

11. The support assembly of claim 8, further comprising a plate at an end of said neck for mounting said head.

12. The support assembly of claim 11, wherein said head is removable from said neck.

13. The support assembly of claim 12, wherein said head is coupled to said plate via a locking mechanism.

14. The support assembly of claim 13, wherein said locking mechanism includes at least one depressible tab for engaging and disengaging the locking mechanism.

15. The support assembly of claim 14, wherein said plate includes a first detent and a second detent and said head includes a recess for receiving said first detent and a rib for abutting said second detent, said detents securing said head to said plate.

16. A tripod assembly comprising:
    a base;
    a plate mounted to said base;
    a head removably mounted to said plate;
    a plurality of legs coupled to said base and movable between an extended position for supporting said base in an upright position and a retracted position;
    wherein said head is coupled to said plate via a locking mechanism including at least one depressible tab for engaging and disengaging the locking mechanism.

17. A tripod assembly comprising:
    a body portion; and
    a plurality of legs coupled to said body portion and moveable between an open position and a closed position;
    wherein said plurality of legs form a tripod to support said body portion in an upright position when in said open position and said plurality of legs enclose said body portion when in said closed position, said plurality of legs forming a protective shell when in said closed position, said protective shell having a greater circumferentially enclosed area than circumferentially open area.

18. The tripod assembly of claim 17, wherein said body portion includes a first end and a second end, said legs coupled to said body portion at said first end and said legs axially extending beyond said second end when in said closed position.

19. The tripod of claim 17, wherein said body portion includes a head, a neck and a base, said protective shell substantially encapsulating said body portion when in said closed position.

* * * * *